(12) United States Patent
Uehara

(10) Patent No.: US 6,330,274 B1
(45) Date of Patent: Dec. 11, 2001

(54) SPREAD-SPECTRUM CONTINOUS-TIME ANALOG CORRELATOR AND METHOD THEREFOR

(75) Inventor: Gregory T. Uehara, Honolulu, HI (US)

(73) Assignee: University of Hawaii, Honolulu, HI (US)

(*) Notice: Subject to any disclaimer, the term of this patent is extended or adjusted under 35 U.S.C. 154(b) by 0 days.

(21) Appl. No.: 09/391,117

(22) Filed: Sep. 7, 1999

Related U.S. Application Data

(60) Provisional application No. 60/099,507, filed on Sep. 8, 1998.

(51) Int. Cl.[7] .................................................. H04B 1/707
(52) U.S. Cl. ............................................ 375/150; 375/343
(58) Field of Search .................................. 375/130, 150, 375/343, 367, 142, 143, 152; 708/422, 426

(56) References Cited

U.S. PATENT DOCUMENTS

| | | | |
|---|---|---|---|
| 4,346,475 | 8/1982 | Alexis | 375/364 |
| 4,400,790 | 8/1983 | Chambers et al. | 364/819 |
| 4,475,208 * | 10/1984 | Ricketts | 380/34 |
| 4,567,588 | 1/1986 | Jerrim | 370/18 |
| 4,884,284 * | 11/1989 | Nakayama et al. | 375/208 |
| 5,029,181 * | 7/1991 | Endo et al. | 375/200 |
| 5,146,471 | 9/1992 | Cowart | 375/380 |
| 5,175,557 * | 12/1992 | King et al. | 342/357 |
| 5,216,691 | 6/1993 | Kaufmann | 375/1 |
| 5,276,705 | 1/1994 | Higgins | 375/1 |
| 5,388,126 | 2/1995 | Rypinski et al. | 375/113 |
| 5,416,623 * | 5/1995 | Dawson et al. | 359/110 |
| 5,574,721 | 11/1996 | Magill | 370/18 |
| 5,610,939 | 3/1997 | Takahashi et al. | 375/206 |
| 5,768,700 | 6/1998 | Kardontchik | 455/333 |
| 5,822,423 | 10/1998 | Jehnert et al. | 379/352 |
| 5,847,623 | 12/1998 | Hadjichristos et al. | 332/105 |
| 5,872,446 | 2/1999 | Cranford, Jr. et al. | 323/315 |
| 5,960,033 * | 9/1999 | Shibano et al. | 375/207 |

* cited by examiner

*Primary Examiner*—Don N. Vo
(74) *Attorney, Agent, or Firm*—Flehr Hohbach Test Albritton & Herbert LLP

(57) ABSTRACT

The present invention is a correlator for use in spread spectrum applications which utilizing continuous-time analog domain signal processing. The correlator include a multiplier which is coupled to an integration capacitance, and an integration reset circuit which is coupled to the integration capacitance. The correlator is designed to receive a first input signal and a second input signal. The multiplier multiplies the first input signal and the second input signal to produce a multiplier output current. The multiplier output current is then integrated by the integration capacitance which produces a correlator output voltage. The integration reset circuit then reset the integration capacitance to a reset voltage.

47 Claims, 10 Drawing Sheets

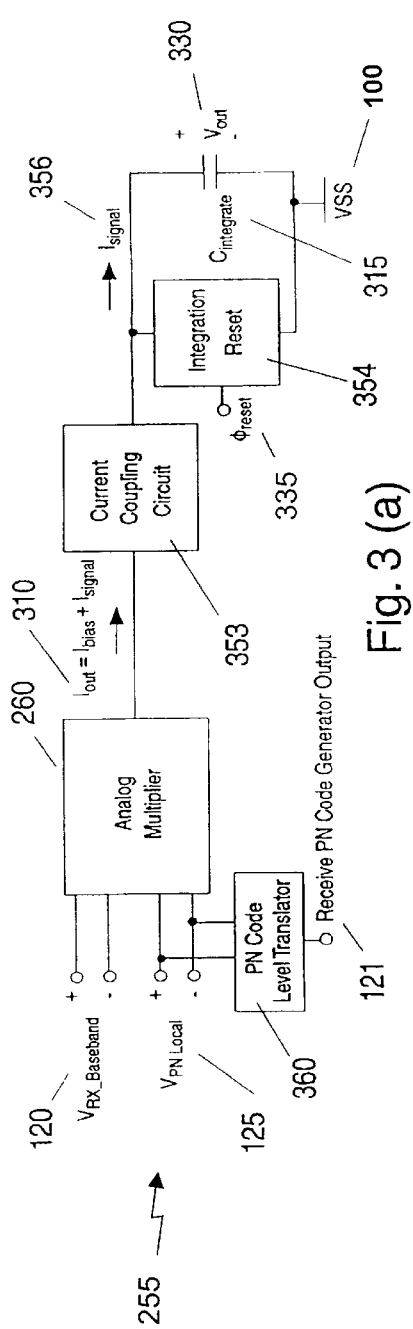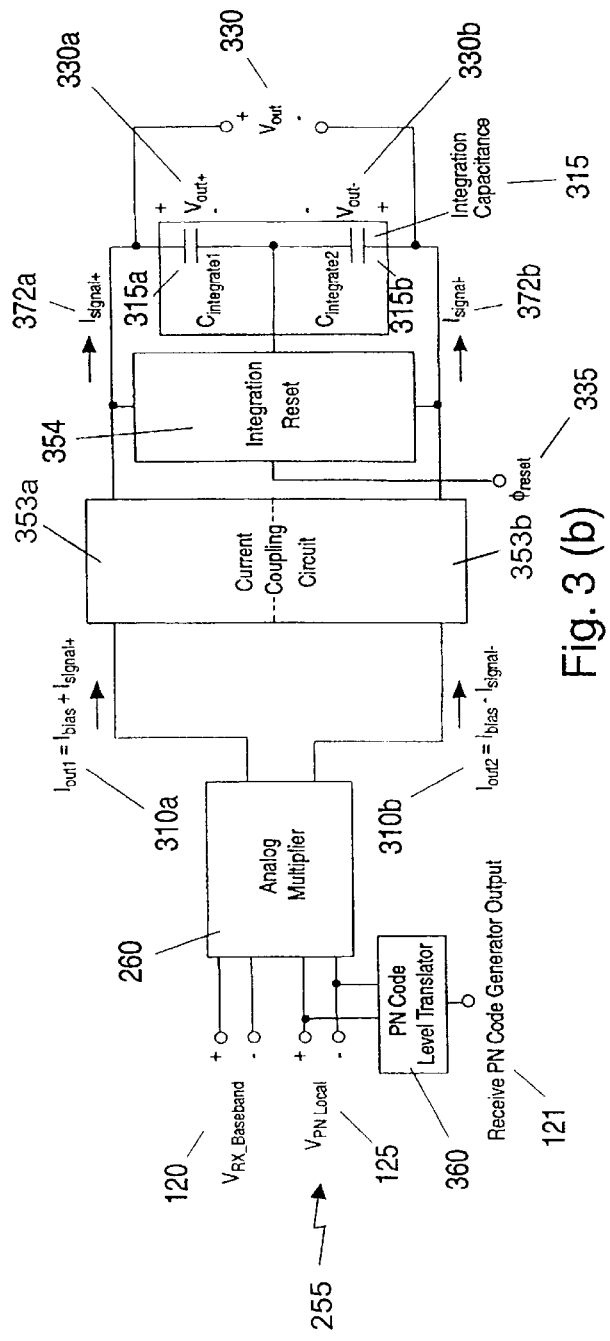
Fig. 3 (a)
Fig. 3 (b)

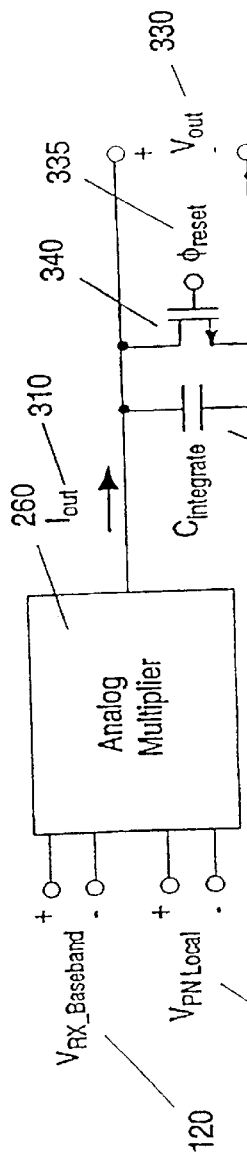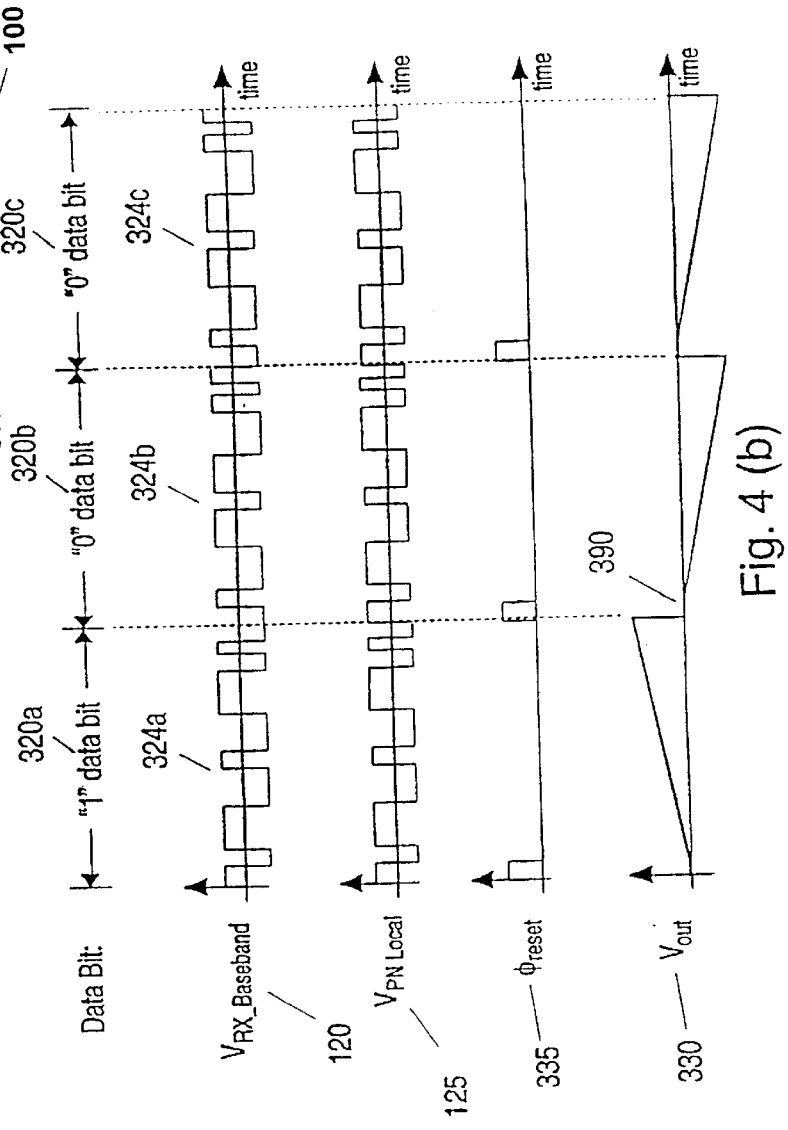

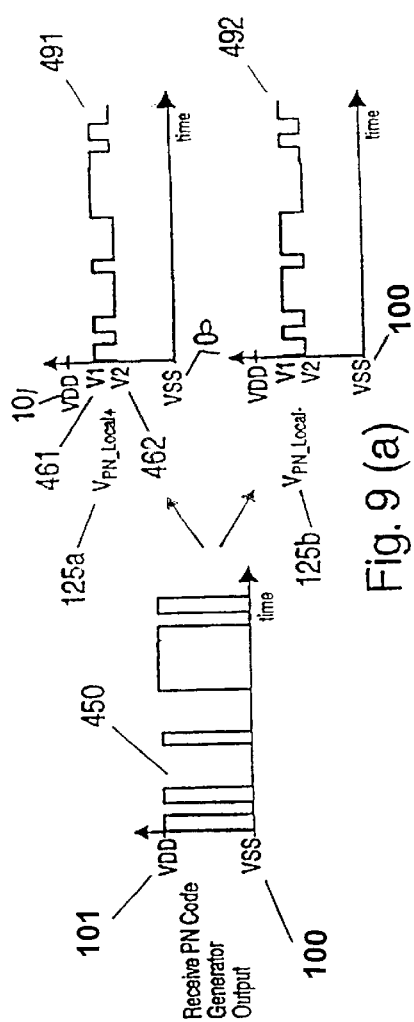
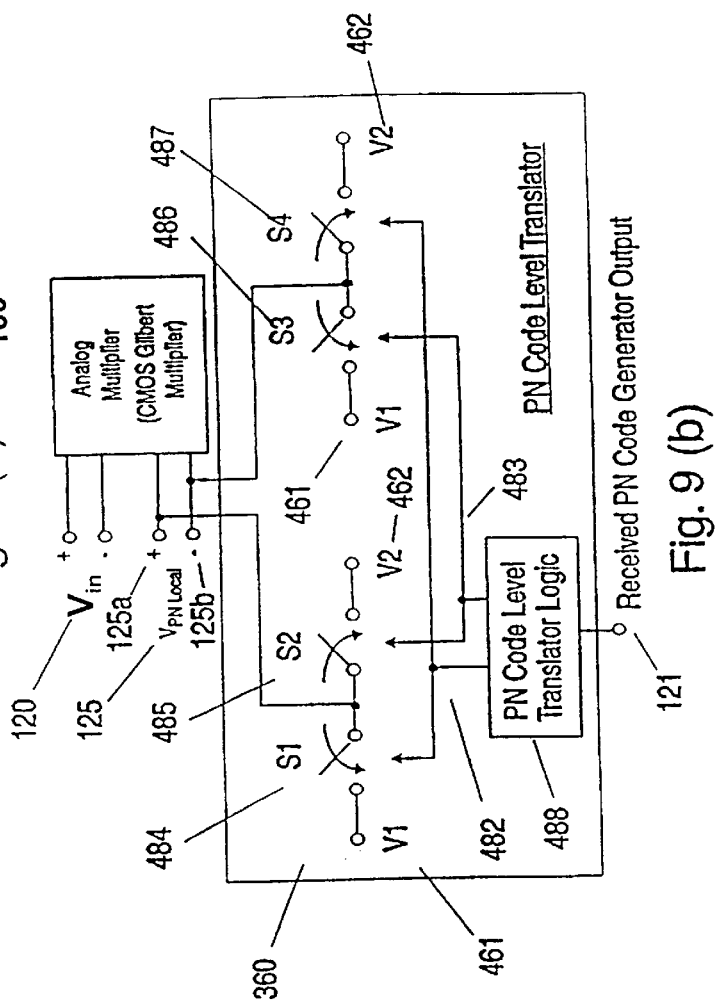
Fig. 9 (a)
Fig. 9 (b)

SPREAD-SPECTRUM CONTINOUS-TIME ANALOG CORRELATOR AND METHOD THEREFOR

RELATED APPLICATIONS

This application claims the benefit under 35 U.S.C. 119(e) to copending United States Provisional Patent Application No. 60/099,507 filed Sep. 8, 1998; and herein incorporated by reference.

FIELD OF THE INVENTION

This invention pertains generally to structures and methods for correlating signals, and more particularly to a structure and method for performing continuous-time analog correlation of signals in direct sequence spread-spectrum communication systems.

BACKGROUND

As the information super-highway continues its frantic expansion, an increasing portion of the computer and communications systems being deployed and in development utilize wireless technologies. One of the key signaling techniques being used in many of these systems is direct sequence code-division multiple access (DS-CDMA) which is one method of spread-spectrum. (See references [1]–[4], hereby incorporated by reference.) Monolithic implementations of receivers for spread spectrum systems typically implement much of the signal processing in the digital domain (See references [1]–[3]). Two important parameters of such implementations are chip cost and power consumption; power consumption being of particular importance in portable applications in order to prolong battery life. For low chip cost, minimum die size in digital CMOS technologies is desirable.

Many systems used in wireless technologies utilize a correlator for correlating the spread-spectrum data signal. One conventional approach for analog implementation of the correlator is to utilize Surface Acoustic Wave (SAW) filters. However, these are not amenable to integrated circuit implementation and are not economically attractive. Charge Coupled Devices (CCD) are another analog approach used to correlate signals. CCDs can be integrated into standard CMOS technology. However, CCDs: i) require additional steps of manufacturing, increasing overall cost; ii) require high-voltage clocking which results in increased power consumption; and iii) require high-voltages are undesirable in battery and portable applications. Another approach to the correlation function is what is referred to as Ad Hoc Mixed-Signal Implementations. These ad hoc approaches greatly compromise the signal processing by implementing gross approximations of the required signal processing, resulting in large performance losses. These ad hoc approaches are less attractive than digital implementations which perform better and can be more easily integrated. Another approach for analog implementation of the correlator is described in K. Onodera and P. Gray (See reference [5]), which uses Switched-Capacitor (SC) techniques. The incoming signal is sampled at twice the chip rate onto capacitors and the sampled voltages are subsequently summed in the charge domain. The SC technique described by K. Onodera and P. Gray underscore some low-power advantages of analog processing by placing the analog-to-digital converter after the correlation, allowing a lower-sampling rate and thus lower-power analog-to-digital converter. However, conventional SC sampling arrays require large areas on the chip die which translates to higher manufacturing cost.

By far the most widespread correlation technique used today is through digital implementation. Analog-to-digital (A/D) converters are used to convert an analog input signal to the digital domain where correlation and all other processing is performed. These techniques are effective for low bit rate systems. But as data rates increase, the sampling rate of the AID converter increases much faster. Thus, digital implementations for future higher rate systems will required an increased power consumption which is undesirable for battery operated portable systems. The performance of the digital correlators is usually compromised by the use of a smaller number of bits in the A/D conversion and processing which affects the size and power of the circuit implementation. The use of a smaller number of bits also compromises the attainable signal processing performance of DS-CDMA signaling. AID converters use smaller number of bits prior to the correlation of the signal that reduces the robustness to continuous-wave interferers. The small number of bits in the A/D conversion makes the system very sensitive to the input dynamic range, requiring complex transmitting power control mechanisms along with the need for a high performance gain control mechanism in the receivers. Other descriptions of spread spectrum techniques are available in the technical literature, including for example, a review article provided in R. Dixon, *Spread Spectrum Systems with Commercial Applications*, Third Edition, John Wiley & Sons, Inc., 1994, which is hereby incorporated by reference.

Partial List of Relevant Literature

[1] C. Chien, P. Yang, et. al., "A 12.7Mchip/s all-digital BPSK direct sequence spread-spectrum IF transceiver in 1.2 $\mu$m CMOS", *ISSCC* 1994 *Digest of Tech. Papers*, vol. 39, pp. 30–31, February 1994.

[2] S. Sheng, L. Lynn, et. al., "A low-power CMOS chip set for spread-spectrum communications," *ISSCC* 1996 *Digest of Tech. Papers*, vol. 39, pp. 346–347, February 1996.

[3] B. Chung, et. al., "Performance analysis of an all digital BPSK direct sequence spread spectrum IF receiver architecture," *IEEE J. Selected Areas in Communication*, vol. 11, pp. 1096–1107, September 1993.

[4] R. Dixon, *Spread Spectrum Systems with Commercial Applications*, Third Edition, John Wiley & Sons, Inc., 1994.

[5] K. Onodera and P. Gray, "A 75 mW 128 MHz DS-CDMA baseband correlator for high-speed wireless applications," 1997 VLSI *Circuit Symposium Dig. of Tech. Papers*, Kyoto, Japan, June 1997.

[6] B. Gilbert, "A precise four quadrant multiplier with sub-nanosecond response," *IEEE J. Solid-State Circuits*, pp. 365–373, December 1968.

[7] *Understanding GPS Principles and Applications*, Editor: Elliott D. Kaplan; Chapter 6, "Effects of RF Interference on GPS Satellite Signal Receiver Tracking," pp. 227–231, Chapter by Phillip Ward, Artech House Publishers, 1996.

SUMMARY OF THE INVENTION

This invention provides a novel integrated circuit structure, method of correlating, and method for the design of a correlator including embodiments for a correlator for DS-CDMA spread-spectrum systems in the analog domain. The inventive structure and method provide both for significantly lower power consumption than known conventional digital correlator implementations and a relatively small required die area. The inventive structure and method uses a different approach and implements the correlation using continuous-time processing. The result is an overall simpler implementation with a lower power consumption and minimal die area, as compared to heretofore known techniques.

While there are many functions involved in the implementation and use of a spread spectrum receiver, this invention disclosure focuses on implementation of important aspects of the inventive correlator structure and method, particularly those aspects involving the multiplication and integrate-and-dump functions.

In one aspect the invention includes a correlator structure which receives two input signals, the receive baseband signal which is the demodulated receive signal after the RF carrier has been removed and a PN code signal. The correlator includes a multiplier coupled to an integrate-and-dump circuit. The multiplier multiplies the two input signals and produces a multiplier output current that is integrated by an integrate-and-dump function which produces a voltage which is proportional to the correlation between the two input signals. This voltage is the correlator output voltage.

In another aspect the invention includes a correlator method of multiplying the receive baseband signal with a locally generated PN code signal producing a multiplied output current. Then integrating the multiplied output current onto a continuous-time and switched capacitor circuit thus producing a correlator output voltage. Other aspects are shown in the drawings and described in the detailed description.

BRIEF DESCRIPTION OF THE DRAWINGS

FIG. 3a is an illustration showing an exemplary embodiment of a first embodiment of the analog correlator.

FIG. 3b is an illustration showing an exemplary embodiment of a second embodiment of the analog correlator utilizing a fully-differential architecture.

FIG. 4a is an illustration showing an exemplary embodiment illustrating the first embodiment of the analog correlator of FIG. 3a.

FIG. 4b is an illustration showing waveforms corresponding to signals in the embodiment of FIG. 4a and illustrating the operation of the analog correlator.

FIG. 5a is an illustration showing a flow diagram of the functions performed by the exemplary embodiment of the analog correlator shown in FIG. 3a.

FIG. 5b is an illustration showing a flow diagram of the functions performed by the exemplary embodiment of the analog correlator utilizing fully-differential processing shown in FIG. 3b.

FIG. 6a is an illustration showing the circuit structure of the Gilbert cell or Gilbert multiplier in CMOS technology utilizing NMOS transistors.

FIG. 6b is an illustration showing the circuit structure of the Gilbert cell utilizing degeneration resistors to modify the performance of the structure shown in FIG. 6a.

FIG. 9 is an illustration showing an exemplary embodiment of a circuit implementing the PN Code Level Translator function required to interface the Receive PN Code Generator output to the analog correlator.

DETAILED DESCRIPTION OF EMBODIMENTS OF THE INVENTION

Figure 1:
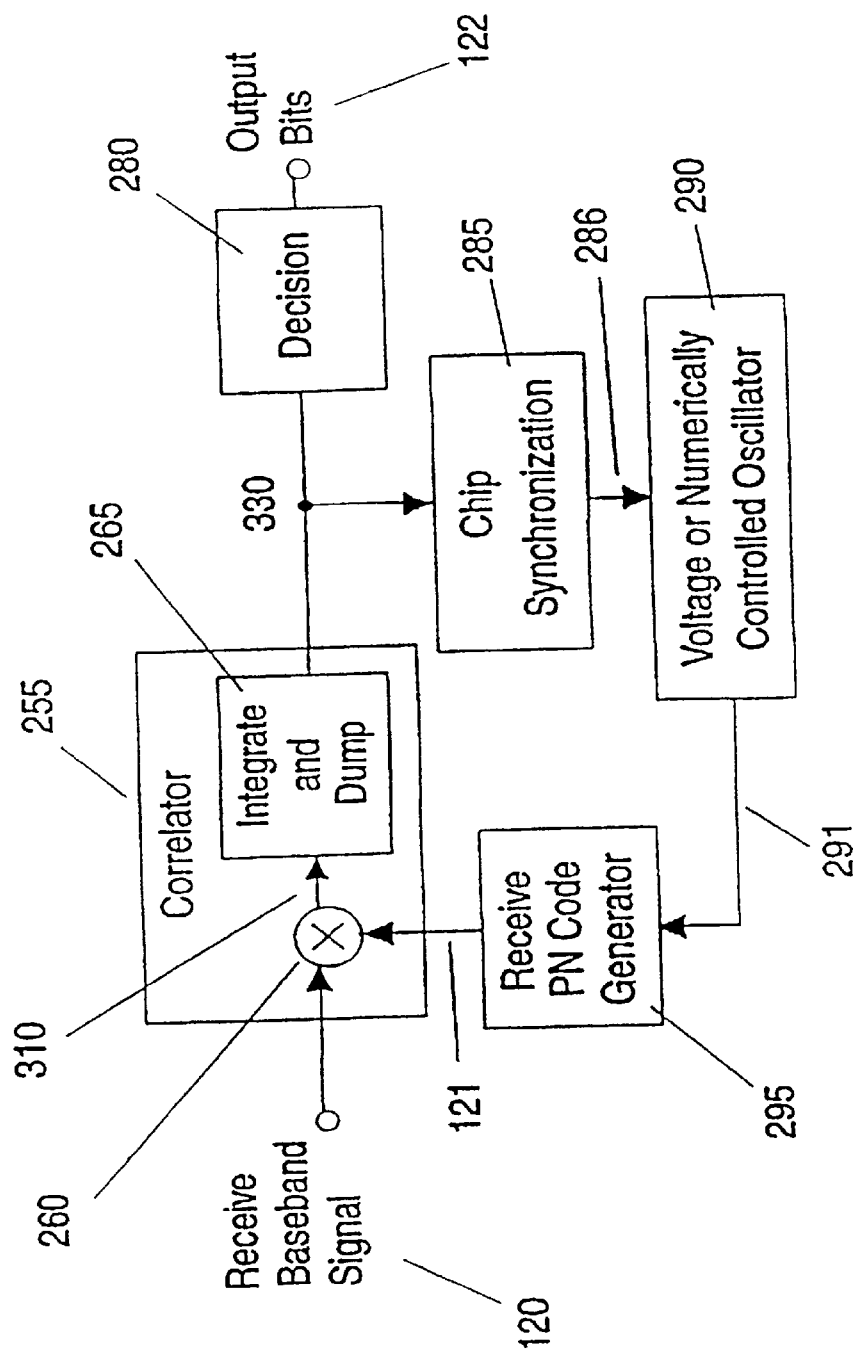
FIG. 1 is an illustration showing an exemplary embodiment of a block diagram of the baseband signaling portion of a receiver for DS-CDMA applications.

This invention provides a new integrated circuit structure for a correlator, method of correlation, and method for the design of a correlator for DS-CDMA spread-spectrum systems in the analog domain. The inventive structure and methods provide both for significantly lower power consumption than known conventional digital correlator implementations and a relatively small required die area.

This new approach for analog implementation of the correlator function for spread spectrum systems which can be implemented in digital CMOS technologies exploits the ease with which both multiplication and integration can be performed in the analog domain. Since it performs the correlation in the analog domain, it can be used to correlate arbitrary analog waveforms. The inventive approach is also appropriate for high-speed and low-power applications. The invention is ideally suited to operate with DS-CDMA signaling.

The inventive structure and method implements the correlation using continuous-time processing and is amendable to integrated circuit technologies. The result is an implementation having a lower power consumption and minimal die area, as compared to heretofore known structures and techniques. An interferer can be, among others, another user, multipath fading, reflections, other noise generated from electrical devices. Since correlation occurs prior to quantization or analog-to-digital conversion, the approach is more robust to interferers than conventional digital methods (As described in Ref. 7). Since continuous-time processing is utilized, a higher dynamic range can be accommodated resulting in a higher sensitivity and increased blocking performance of unwanted interfering signals.

While there are many functions involved in the implementation and use of a spread spectrum receiver, this invention disclosure focuses on implementation of important aspects of the inventive correlator structure and method particularly those aspects involving the multiplication and integrate-and-dump functions.

The present analog correlator can be implemented, unlike the SAW and CCD prior art approaches, in a low-cost standard digital silicon CMOS technology utilizing the accepted power supply for CMOS systems, for example a standard 3V supply for a 0.35 Fm CMOS technology. The present analog correlator further implements the correlation via a high-performance multiplication and integration thus implementing the ideal equations directly, unlike the Ad Hoc Mixed-Signal implementations with highly compromised performance as described above. This high-performance and integration results in performance which approaches the ideal expected for DS-CDMA signaling. The Switched- Capacitor Analog approach described above operates in the charge domain and thus tends to be parasitic sensitive. The present correlator operates using voltages and currents allowing the correlator to be designed to be more robust to parasitic capacitance.

One of the novel features of the correlation approach of the present invention is hat it can achieve 7–8 bits of processing at a lower power consumption and smaller die area than can be achieved in the prior art digital implementations. The prior art digital implementations have compromised performance with the use of a small numbers of bits in the front-end A/D converter or have very high power consumption with the use of 7–8 bits in the front-end A/D converter. Further, unlike the switched-capacitor analog approach of the prior art, the present correlator achieves wide dynamic range, robustness to continuous-wave interferers and large effective numbers of bits in correlation in a small die area while being far less sensitive to parasitic capacitance.

The present invention can be used in a wide range of communication applications such as wireless networking (home networks, local area networks, wide-area networks), global positioning system (GPS), radio-frequency identification (RF ID), cellular voice and data, satellite voice and data, wired networking such as cable modems, toys which communicate over wireless links, remote sensing; and data storage applications such as magnetic storage hard drives, compact disks, and digital video disks (DVD). It can be used for a variety of signaling methods, for example DS-CDMA, pulse-position modulation, and phase-shift key modulation. These examples do not limit the applications of the invention but are merely representative of a few of the possible applications, nor do these examples represent an exhaustive listing of applications. Many other applications are available for the present invention as would be apparent to someone skilled in the art.

The description of embodiments of the invention is conveniently provided in three parts: (i) baseband portion of a basic DS-CDMA spread spectrum receiver, role of the correlator, and a brief description of the prior art; (ii) an exemplary analog circuit implementation of a correlator containing five key elements, and (iii) preferred embodiments of the five key elements comprising the exemplary implementation of the analog correlator. This compartmentalization is provided for the readers convenience and should not be interpreted as limiting the description of the invention in any way.

We first turn our attention to a simplified block diagram of the key signal processing blocks in the baseband processing portion of a communication channel receiver employing direct sequence spread spectrum signaling and consider differences between analog and digital implementations and methods. The following discussion provides an example context for the invention and is one of many possible architectures. No assumption is made as to whether the signal processing is performed in the analog or digital domains. An exemplary embodiment of the key receiver baseband signal processing blocks is provided in FIG. 1. We assume the radio-frequency (RF) front-end processing to have removed the RF carrier from the receive signal, resulting in the Receive Baseband Signal 120 which is a first input signal to the baseband processing portion of the receiver. In this embodiment, correlator 255 includes a multiplier circuit 260 and an integrate-and-dump circuit 265. Multiplier 260 within correlator 255 receives Receive Baseband Signal 120 from, for example, an RF demodulator followed by a filter (not shown) as is known in the art. Multiplier 260 also receives a second input signal, the output signal of the Pseudorandom Number (PN) Code Generator 295 which is described in greater detail hereinafter.

The multiplier output signal 310 is communicated to the integrate-and-dump circuit 265 which generates a correlator output signal representing the correlation between the signals applied to the two multiplier inputs. The integrate-and-dump circuit 265 integrates the multiplier output for the duration of a data bit. At the end of an integration period: a) the output of circuit 265 is sampled by circuit block(s) that follow; b) the output is reset to a zero reference; and c) integration for the following received bit commences. The correlator output signal is communicated to two blocks: a Decision circuit 280 which utilizes the correlator output to determine the received data bits; and to the serial combination of a Chip Synchronization circuit 285 a Voltage- or Numerically-Controlled Oscillator 290. Synchronization circuit 285 is responsible for generating a control signal derived from correlator output 330, while controlled oscillator 290 receives the synchronization circuit output 286 and generates a clock signal 291 that is provided as the input to Receive PN Code Generator 295. The Receive PN Code Generator output 121 is the second input into mixer 260 as already described. This completes a feedback loop from the Correlator 255, through the Synchronization circuit 285, the Controlled Oscillator 290, and the Receive PN Code Generator 295. The effect of this feedback loop is to align output 125 with the PN code modulating the data bits comprising the received signal. Decision circuit 280 may be a simple thresholding circuit as is know in the art or more complex (such as a sequence detector). The decision circuit 280 generates an output bit 122 decision for each correlated bit received.

Data transmission for systems employing phase-shift keying signaling is typically sent in quadrature, that is data is sent on two carriers at the same frequency separated by a 90 degree phase difference and thus doubling the amount of information that can be transmitted and received. Architectures for quadrature reception can be devised utilizing the correlator invention as a building block by using the correlator invention (described more fully below) in places where the correlation function is required.

Figure 2:
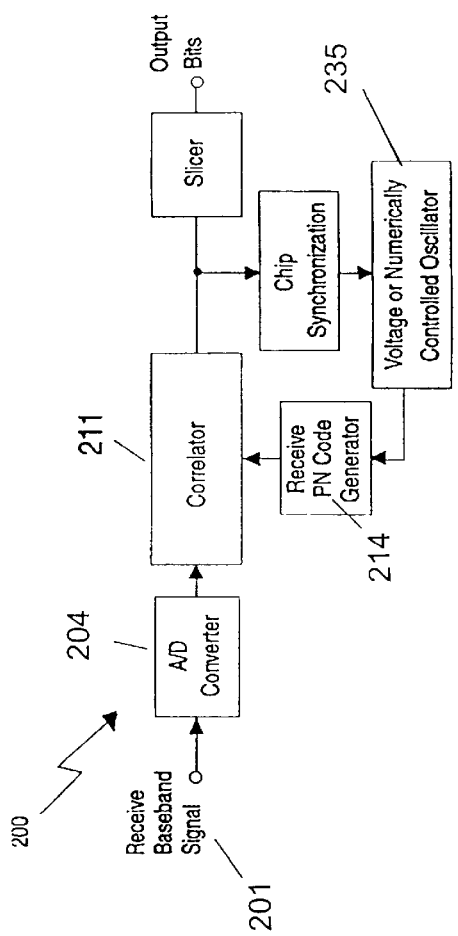
FIG. 2a is an illustration showing an exemplary embodiment of a block diagram for a digital implementation of the block diagram of FIG. 1.
FIG. 2b is an illustration showing an exemplary embodiment of a block diagram for the inventive analog implementation of the block diagram of FIG. 1, and method for reducing the speed requirements of the analog-to-digital interface and for reducing the overall power consumption of the receiver.
Figure 2:
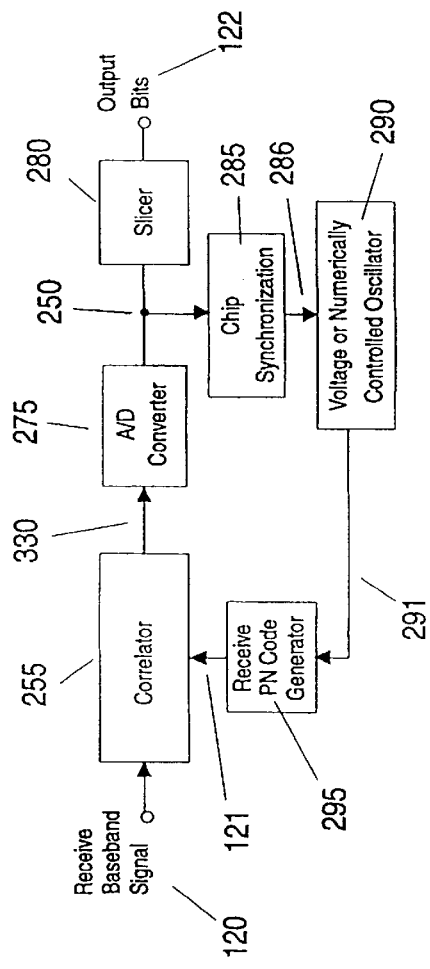

A block diagram of an embodiment of a digital implementation of the block diagram of FIG. 1 is shown in FIG. 2a. This system 200 has features in common with the system already shown and described relative to FIG. 1, except that the receive baseband signal 201 is passed through an analog-to-digital converter (ADC) 204 at the front-end prior to Correlator 211 and all of the baseband processing blocks. Correlator 211 receives as input, the output of ADC 210 and the output of Receive PN Code Generator 214 as already described. In this embodiment, each of the blocks except the oscillator 235 (which may be implemented in either the analog or digital domain) are implemented in the digital domain.

There are two key disadvantages of a fully digital implementation for high-speed applications. First, the analog-to-digital interface 204 and all the digital processing must be operated at a minimum of twice and often greater than twice the chip rate. The chip rate is the rate at which the modulating PN code is generated and typically a minimum of 10 and as much as 1000 or more times greater than the data bit rate. Sampling the input signal and processing at the minimum of twice the chip rate is required in order to maintain benefits of DS-CDMA (See reference [4]). Second, the number of bits in the analog-to-digital conversion is limited to a small number (typically one or two) due to power consumption considerations in the correlator. This limits the dynamic range of the Receive Baseband Signal 201 as well as the overall receiver sensitivity.

The receiver channel architecture illustrated in FIG. 2b provides structure and method for: 1) reducing the speed requirements of the analog-to-digital interface 204; 2) reducing the overall power consumption of the receiver which is implemented through the correlator of the present invention; 3) increasing the input dynamic range; and 4) increasing receiver sensitivity. In this embodiment, the multiplication of the Receive Baseband Signal 120 with the Receive PN code signal 121 in correlator 255 and the subsequent integrate-and-dump operation (internal to correlator 255) are performed in the analog domain. This allows analog-to-digital converter 275 to operate at a rate near the data bit rate as opposed to multiples of the chip rate (See reference [4]) and eliminates the need for the high-speed digital correlation.

We now turn our attention to a more detailed description of an embodiment of analog correlator 255. A first embodiment of analog correlator 255 is shown with signal inputs and outputs in the block diagram of FIG. 3a. The two input signals are voltages: $V_{in}$ 120, which is the Receive Baseband Signal; and $V_{PN\_Local}$ 125, which is a level translated version of the Receive PN code generator output 121. The correlator is comprised of five key blocks: (1) an analog multiplier 260; (2) a current coupling circuit 353; (3) an integration capacitor 315; (4) an integration reset circuit 354; and (5) a PN code level translator 360. The analog multiplier 260 generates a multiplier output current $I_{out}$ 310 that has a bias component $I_{bias}$ that is constant, independent of the input signal, and a signal component $I_{signal}$ that is proportional to the product between the two input voltage signals. The current coupling circuit 353 which couples $I_{out}$ 310, and more preferably just the signal carrying component $I_{signal}$ to the integration capacitance $C_{integrate}$ 315 which integrates the multiplier output current 310. The integration reset circuit 354 initializes or precharges the correlator output voltage $V_{out}$ 330 across the integration capacitance 315 to a zero reference value. The PN code level translator 360 converts receive PN code generator output 121 from binary levels with values equal to the power supply or ground to appropriate levels for receive PN code signal 125 into the multiplier 260.

FIG. 4a shows a conceptual block diagram illustrating the functioning of the analog correlator described above. The multiplier 260 multiplies the receive baseband signal 120 and the receive PN code signal 125 and outputs a multiplier output current 310 proportional to the product of the input voltages. In this example, since the multiplier output current bias term is zero, the Current Coupling Circuit 353 of FIG. 3a is simply a wire connecting the multiplier output to the integration capacitor $C_{integrate}$ 315. The integration reset circuit 354 of FIG. 3a is an NMOS initialization switch 340. The gate terminal of the initialization switch 340 is coupled to a reset signal 335 while the source of the initialization switch 340 is coupled to the negative terminal of the integration capacitor 315 (also connected to ground). The correlator output 330 is shown in FIG. 4b for three data bits where a "1" data bit is followed by a succession of two "0" data bits. The Receive Baseband Signal 120 is shown as a pseudorandom number (PN) code with one polarity representing a "1" data bit and the same code with the opposite polarity for the "0" data bit. A detailed description of the operation of a DS-CDMA can be found in reference [4]. Via a feedback loop (not shown), the receive PN code generator aligns the locally generated PN code to the incoming receive baseband signal 120 as shown. In this example, the reset $f_{reset}$ signal 335 is shown active (HIGH) for one chip time at the beginning of each received bit. During this time, the correlator output voltage $V_{out}$ 330 is reset to zero volts 390. When reset signal 335 returns to the LOW state, the multiplier output current 310 is integrated by the integration capacitor 315. In this example, since input signals 120 and 125 are aligned, multiplier output current 310 is constant with a positive polarity in the case of the "1" data bit and constant with a negative polarity in the case of the "0" data bits. Thus, the correlator output voltage 330 ramps linearly to a positive value in the case of the "1" bit and to a negative value for the "0" data bits. At the end of a bit time, the correlator output voltage 330 is sampled by the stage that follows (possibly an A/D converter). Then, reset 335 becomes active and turns on reset switch 340, resetting the integration capacitor 315 to zero volts for the start of a new correlation cycle.

Resetting the integration capacitance once every data bit highlights a signal processing compromise. In the example just described, reset signal 335 is on for one chip time, thus the multiplier output current 310 is simply shunted to ground. The result is the multiplier output current 310 during this time interval makes zero contribution to the correlation, and can compromise the accuracy of the correlation. Two possible solutions follow. The first possible solution is to reduce the time duration that the reset signal 335 is active. This will reduce the amount of output current shunted to ground and minimize any error effect of the reset process on the correlation. A second possible solution is to use an architecture where one multiplier feeds two time-interleaved integrate-and-dump sections. While one section is integrating the output current from the multiplier, the other is resetting the voltage across its integration capacitor. At the end of the correlation, the multiplier output switches to the second section while the first is reset. In this way, zero correlation time is spent by either of the correlators in the reset mode during a correlation interval. Solutions such as these enable the effect of the reset process to be sufficiently small as to become inconsequential or even eliminated for a modest cost in additional hardware.

A preferred embodiment of analog correlator 255 utilizes a fully-differential architecture as shown in FIG. 3b. Compared with the single-ended implementation in FIG. 3a, the fully-differential architecture results in increased dynamic range and rejection of common-mode signals which are typically noise signals. The same five key functional blocks of FIG. 3a are present except that the output of the multiplier has two output currents $I_{out1}$ 310a and $I_{out2}$ 310b and the signal information is contained in the difference between these two output currents 310a and 310b. Current coupling circuits 353a and 353b are shown separately but may be implemented together as a single block. In this approach, the correlator output voltage $V_{out}$ 330 is defined as the difference between $V_{out+}$ 375 and $V_{out-}$ 330b which are defined across the integration capacitors $C_{integrate1}$ 315a and $C_{integrate2}$ 315b, respectively. Multiplier output currents 310a and 310b may be coupled to capacitors 315a and 315b directly to integrate the output currents. In a preferred embodiment, similar to that shown in FIG. 3a, only the signal components ($I_{signal}$) of the output current are coupled to the integration capacitors 315a and 315b. Integration reset circuits 354a and 354b reinitialize the correlator output voltages 330a and 330b at the end (or beginning) of an integration period. A similar PN Code Level Translator 360 can be used as described for the approach shown in FIG. 3a in the fully-differential implementation. The fully-differential architecture requires the addition of common-mode feedback. Possible implementations for each of these blocks are presented hereinafter.

Figure 5:
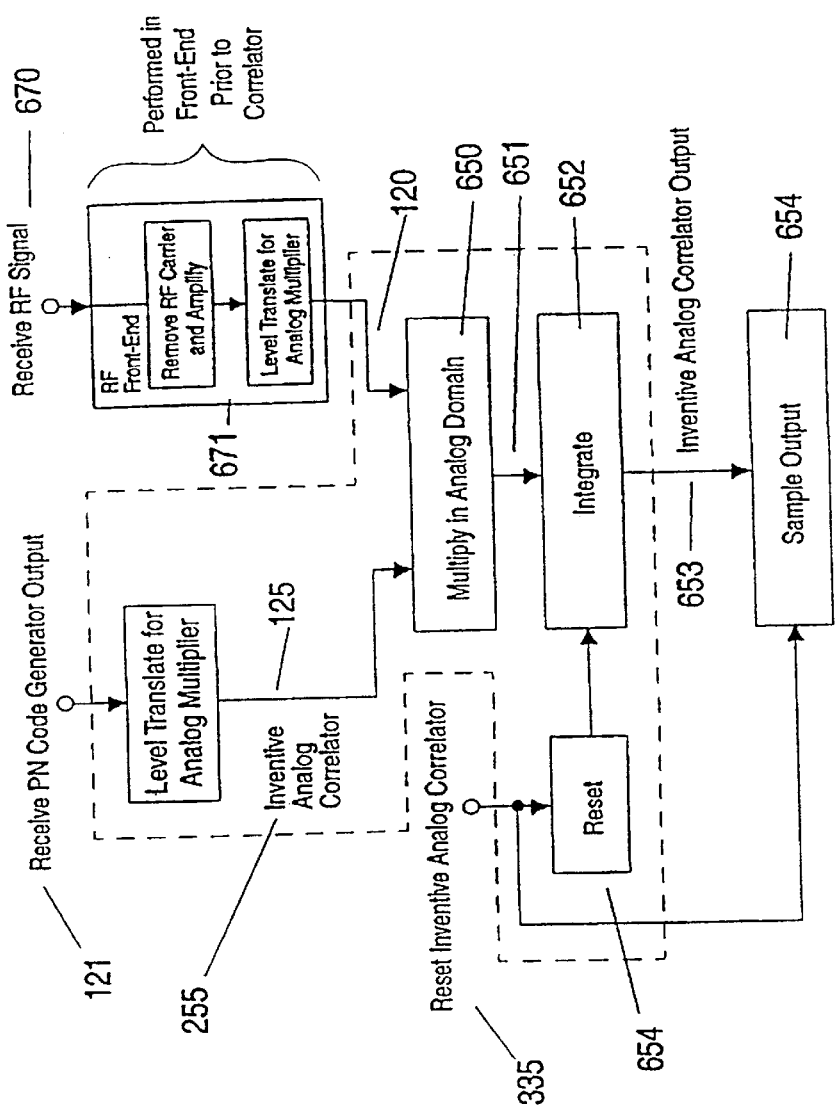
Figure 5:
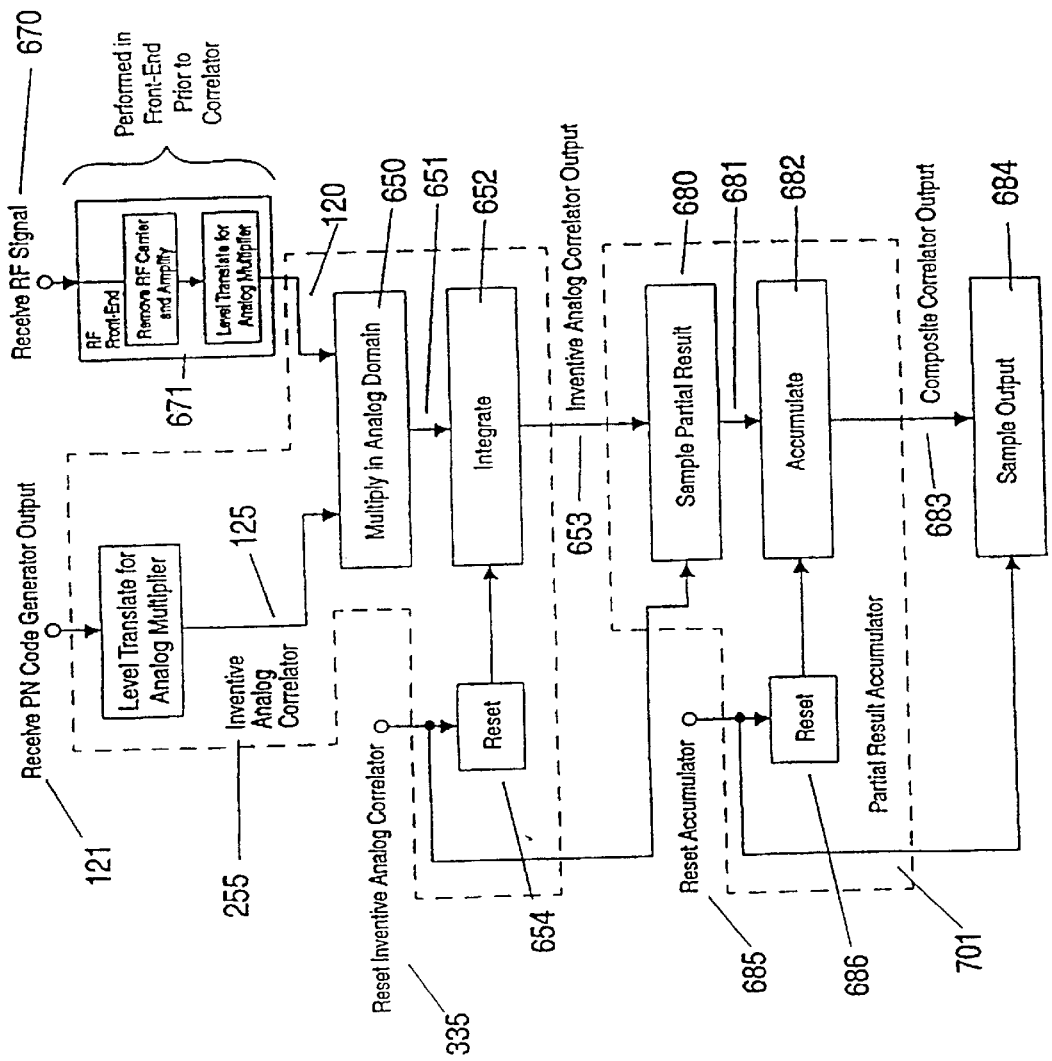

A flow-chart of the correlation procedure is shown in FIG. 5a. The correlation between two input signals is continuously performed for a finite duration called a correlation period. When used to correlate DS-CDMA signals, this structure is suitable or applications where the data bit period is equal to the correlation period. At the end of each correlation period, an output signal proportional to the correlation between the two input signals is generated 653. A Receive RF Signal 670 is processed by the RF Front-End 671 which removes the RF carrier, provides amplitude control and establishes the input common-mode level of the Receive Baseband Signal 120. The Receive baseband signal 120 is one of two inputs into the multiplier block 650 which performs the analog multiplication of the two input signals. The Receive PN Code Generator Output 121 is level translated 672 to generate the second analog multiplier input 125. These two signals are multiplied in the analog domain and a multiplier output signal is generated 651. The multiplier output 651 is then integrated 652. The multiplier output 651 can be a current, in which case the integration function 652 can be performed by feeding this current to a capacitor. The continuous integration of the current onto the capacitor will generate an output voltage across the capacitor. At the end of the correlation period signified by a correlator reset signal 335, the integration of the multiplier output 651 produces the correlator output 653. The correlator output 653 is then sampled 654. The reset function 654 then triggers the integrator is reset to a zero reference. In the case that the integration is performed by integrating the multiplier output current onto a capacitor (or capacitors in the case of a fully-differential implementation), the voltage across the capacitor is reset to a zero reference. The process is then repeated until the entire received RF signal has been correlated.

In applications where the integration time is relatively long (several hundred of microseconds or more) as can occur, for example, as the number of PN code chips per data bit becomes large (i.e., exceeds 127), the effect of leakage currents associated with reverse biased PN junctions, albeit relatively small, can accumulate over time and become significant over the course of a long correlation period. Consider the case described above where the multiplier output is a current and the integration is performed by integrating the output current onto a capacitor. Reverse biased PN junctions, inherent in integrated circuit transistor structures will be connected to the integrating capacitor. The leakage current will result in the removal of current from or the addition of current to the integrating capacitance, affecting the accuracy of the correlation. One solution is to use a composite correlator structure in which the inventive analog correlator is followed by a second structure called a Partial Result Accumulator.

A flow-chart for the correlation of two signals utilizing a composite correlator comprising the inventive analog correlator 255 and a Partial Result Accumulator 701 is shown in FIG. 5b. This structure enables and affects a composite correlation period longer than the correlation period of the analog correlator 255. The composite correlation period will typically be comprised of a multiplicity of equal or nearly equal duration correlation periods of the analog correlator 255. The composite correlator output is the accumulated sum of analog correlator outputs 653 over the composite correlation period. Each sample of the analog correlator output is called a partial result. Thus, a composite correlator output is generated by accumulating partial results over the composite correlation period. When used to correlate DS-CDMA signals, this structure is suitable for applications where the data bit period is equal to the composite correlation period. At the start of the composite correlation period, both the accumulator which implements the accumulate function 682 and the integrator which implements the integrate function 652 in the inventive analog correlator 255 are reset to zero and the composite correlation commences. When the first correlation period of the inventive analog correlator is complete (defined by the correlator reset signal 335), its output is sampled 680 by the partial result accumulator 701 and comprises the first partial result. The integrator implementing the integration function 652 in the inventive analog correlator is then reset and the next correlation period begins. When reset signal 335 signifies the end of the second correlation period of analog correlator 255, the partial result accumulator 701 again samples analog correlator output 653. This second partial result is added to the first. This process is repeated until the composite correlation period is complete. Then, the composite correlator output 683 is sampled by a block(s) 684 which follows, and the start of the following correlation period begins starting with the reset of the blocks which implement the integrate 654 and accumulate 686 functions.

The partial result accumulator 701 can be implemented in either the analog or digital domain. An analog implementation might use switched-capacitor techniques where the partial results are sampled from the analog correlator 255 output onto sampling capacitors of equal value. A correlator output is generated by summing the charge sampled onto the sampling capacitors, and converting the total sampled charge to an output voltage. In this solution, the partial result accumulator 701 is a switched-capacitor circuit. Other switched-capacitor embodiments are possible. A digital implementation will involve an A/D converter. One such possible implementation is as follows. Partial correlation results are generated by the inventive analog correlator 255 and sampled and converted to digital representation by an A/D converter. By summing the digital representations of the partial correlation results, a correlator output is generated in the digital domain. In this case, the partial result accumulator is a digital integrator circuit which accumulates digital representations of the partial results. While this method involves an A/D converter in the correlation, the A/D converter is able to operate at a rate that is still much less than the chip rate and benefits of the inventive analog correlator 255 can still be realized.

We now turn our attention to preferred embodiments of the five functional blocks of FIG. 3a and FIG. 3b. We will first present embodiments of the multiplier 260. Next, we will present composite structures which perform the three functions of: current coupling 353, integration 315, and reset 354. These embodiments utilize fully-differential architectures and as such includes common-mode feedback which is also achieved by the implementations described below. Finally, an embodiment of the PN code level translator function is presented.

Figure 6:
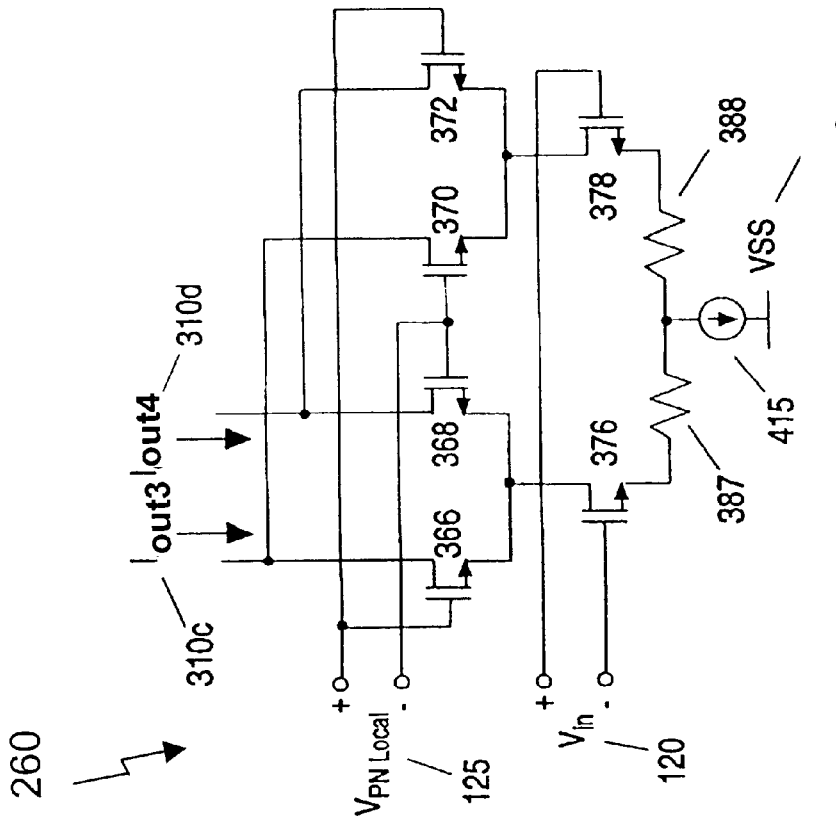
Figure 6:
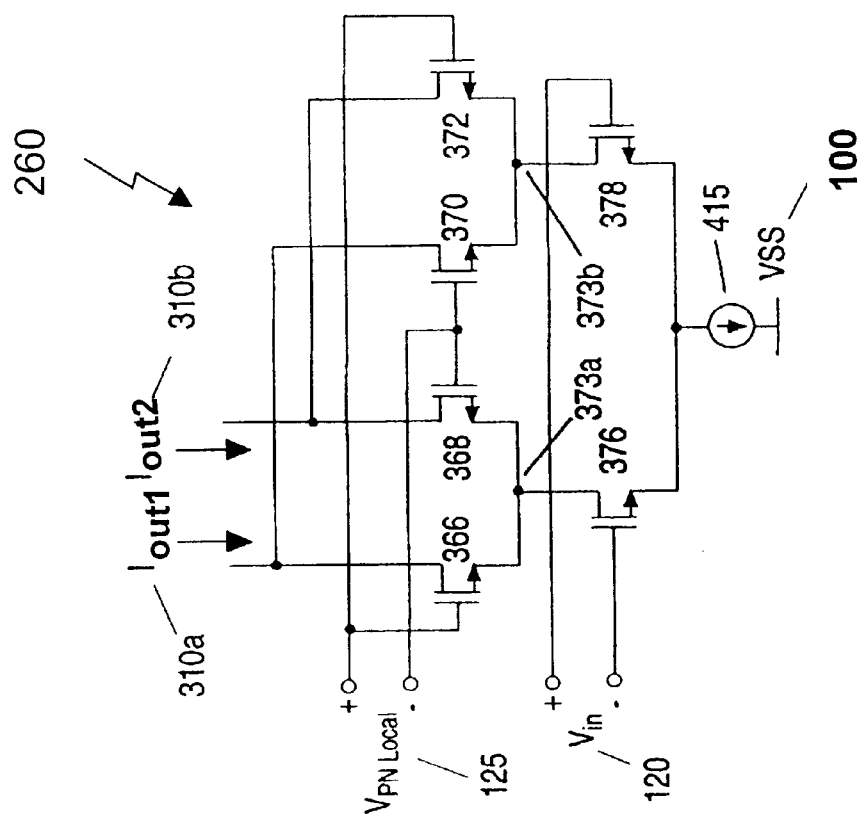

A preferred embodiment of the multiplier is the Gilbert multiplier cell 260 (Gilbert cell). FIG. 6a illustrates a prior art Gilbert cell or multiplier implemented in CMOS technology. The Gilbert cell 260 is shown constructed from a set of grouped NMOS transistors. An implementation comprised of PMOS transistors is also possible with the appropriate modifications. As shown in FIG. 3b, the circuit receives two differential input voltages $V_{in}$ 120 and a $V_{PN\_Local}$ 125. Multiplier output currents $I_{out1}$ 310a and $I_{out2}$ 310b both contain a common bias term which biases the NMOS transistors and a signal term opposite in polarity from one another and proportional to the product between inputs 120 and 125. Designing the input coupling circuits such that the input common-mode level for both pairs of inputs $V_{in}$ 120 and a $V_{PN\_Local}$ 125 is such that all six transistors (366, 368, 370, 372, 376, and 378) operate in the saturation region with zero differential input is desirable. Designing the Gilbert multiplier 260 such that transistors 376 and 378 operate as a linear transconductor stage is also desirable. And finally, designing transistors 366, 368, 370, and 372 together with the input voltage levels of $V_{PN\_Local}$ 125 such that transistor pair 366–368 and pair 370–372 operate as current switches such that all the current from transistors 376 and 378 flows in either 366 or 368 and 370 or 372, respectively, and such that this switching occurs with the minimum excursion of voltages on nodes 373a and 373b is also desirable. For further discussion of the Gilbert multiplier circuit, see B. Gilbert "A precise four quadrant multiplier with sub-nanosecond response," *IEEE J. Solid-State Circuits*, pp. 365–373, December 1968; which is hereby incorporated by reference. The U.S. Pat. No. 5,768, 700, "High Conversion Gain CMOS Mixer", describing the use of a Gilbert cell is also incorporated by reference.

Another embodiment of the multiplier is the modified Gilbert multiplier shown in FIG. 6b. In this implementation, resistors 387 and 388 are added to degenerate the differential pair comprised of transistors 376 and 378. The same desirable design parameters for the multiplier of FIG. 6a described above still apply. The result of the degeneration is to reduce the input transconductance, increase the input linear range, and increase the linearity of the transconductance of the input differential pair to which voltage $V_{in}$ 120 is applied.

While other multiplier circuits may be used, for example, diode mixers and passive switching mixers, use of a Gilbert Multiplier 260 of the type described here is advantageous because it: (i) is amenable to integrated circuit implementation utilizing MOS or IGFET transistor structures or combination technologies which include both MOS or IGFET transistor structures combined with bipolar transistor structures; (ii) differential pairs M1–M2 366–368 and M3–M4 370–372 can be degenerated with resistors or triode region transistors to increase input linear range as had been shown in FIG. 6b; (iii) the current that flows into its two output terminals which are the nodes connecting the drains of M1 366 and M3 370 and the drains of M2 368 and M4 372 have two components, a bias component equal to one-half of bias current $I_{bias1}$ 415, and a differential component proportional to the product between the two input voltages $V_{PN\,Local}$ 125 and $V_{in}$ 120, and as such, it can easily be coupled with robust and well-known integrator implementations as the telescopic and folded cascode structures as will be described.

Figure 7:
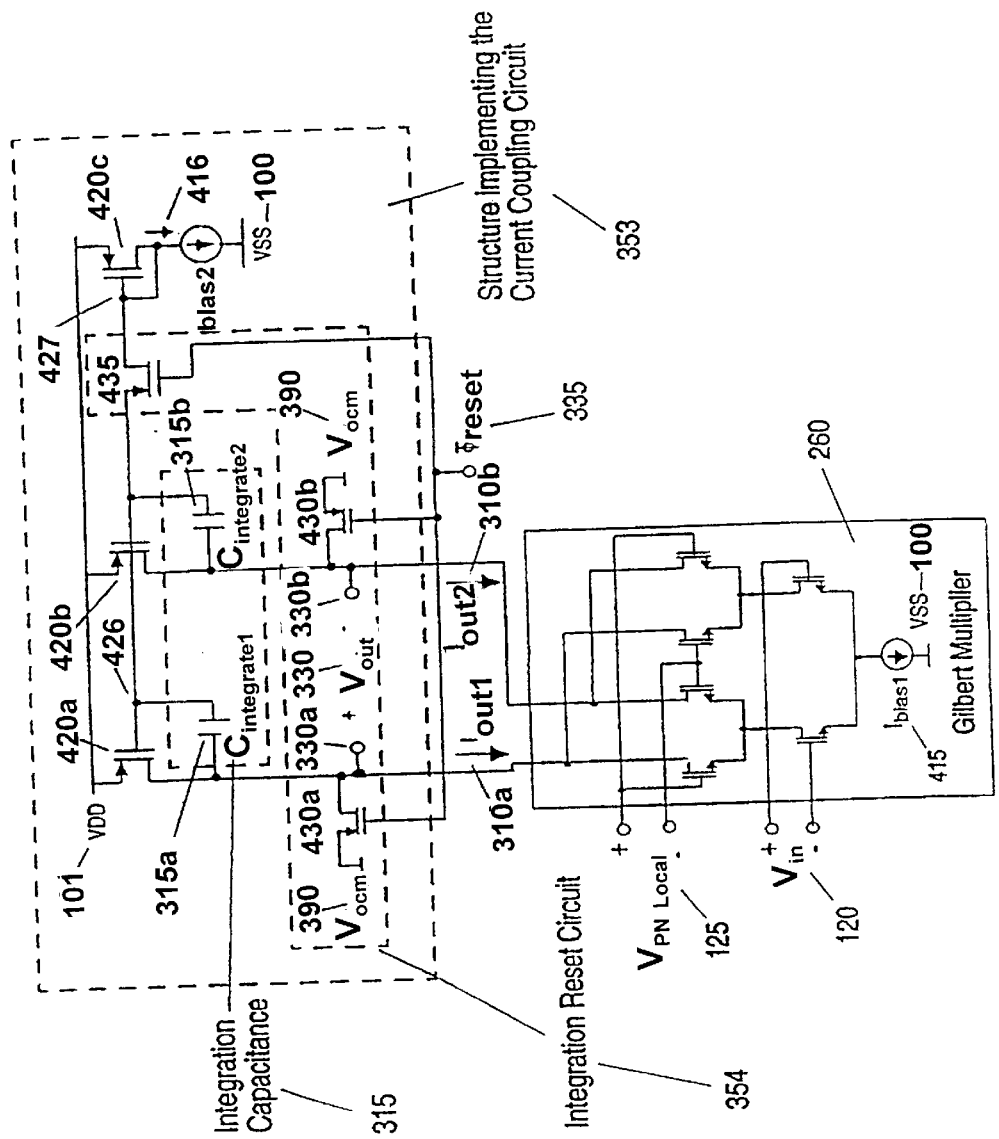
FIG. 7 is an illustration showing an exemplary embodiment of an IC correlator including the multiplier, current coupling circuit, load capacitors, and reset circuit where the correlator employs a telescopic integrator section also providing common-mode feedback.

A preferred embodiment of the Current Coupling Circuits 353, integration capacitors $C_{integrate1}$ 315a and $C_{integrate2}$ 315b, and the integration reset circuit 354 of FIG. 3b is shown in a compact form in FIG. 7. A Gilbert multiplier 260 is shown coupled to the circuit components which perform the three key functions of current coupling, integration, and reset described earlier. Biasing current transistors 420a and 420b provide the bias current component from the positive supply VDD 101 for the Gilbert multiplier 260. Since the correlator output nodes 330a, 330b are high impedance nodes, common-mode feedback is used to define and stabilize the DC bias voltage of these nodes near a common-mode output reference voltage $V_{ocm}$ 390 that is generated by a separate circuit. Integration capacitors $C_{integrate1}$ 315a and $C_{integrate2}$ 315b perform double duty. First, they act as the integration capacitors. As described earlier, the multiplier output 310 of Gilbert multiplier 260 has two components, a bias term and a signal term. The bias term is provided by first and second PMOS biasing current source devices 420a and 420b. Since the current from VDD 101 is fixed by the first and second biasing current source devices 420a and 420b, the differential multiplier output current 310 from the Gilbert multiplier 260 can only flow to the integration capacitors 315a and 315b. Thus, this coupling circuit 353 removes the bias term and couples only the signal carrying term to capacitors 315a and 315b as is preferred. (Alternatively, both bias and signal terms of the multiplier output current 310 can be output to the integration capacitors and the resulting common-mode voltage resulting from the bias term removed by a later signal processing step). Second, they participate in implementing common-mode feedback. During the period that the reset signal 335 of FIG. 3b is active (HIGH), signal 335 of FIG. 7 is LOW thus activating the first, second and third PMOS reset switches 430a, 430b, and 435. When the third reset switch 435 turns on, the gates of first and second biasing current transistors 420a and 420b (node 426) are coupled to the gate-drain connection of a third biasing current transistor 420c (node 427) through third reset transistor 435. The first and second biasing current transistors 420a and 420b now have the same gate-source voltage as the third biasing current transistor 420c and as a result, they mirror the current which flows in the third biasing current transistor 420c which equals the second biasing current $I_{bias2}$ 416. Meanwhile, the first and second PMOS reset switches 430a and 430b turn on and force correlator output nodes 330a and 330b to the output common-mode voltage $V_{ocm}$ 390. This also initializes the differential correlator output voltage $V_{out}$ 330 to zero. The output common-mode voltage $V_{ocm}$ 390 will typically be chosen to maximize the output voltage swing at the correlator output voltage $V_{out}$ 330; for example, in the case where the power supply is 3 V, an appropriate value for 390 will be around 2 V. When the reset signal 335 becomes inactive, the first, second and third PMOS reset switches 430a, 430b, and 435 are turned off. The differential signal currents from the multiplier flow to the integration capacitors 316, 317 causing the voltage at output nodes 330a and 330b move in opposite directions. Capacitors 315a and 315b couple output node voltage changes back to node 426. When the output node voltages move in opposite directions, there is zero effect on 426. However, when the output voltages move in the same direction, they couple this change back to 426 resulting in a change in the current in the first and second biasing current transistors 420a and 420b which acts to minimize the voltage change at the output nodes. Thus, common-mode feedback is achieved.

Figure 8:
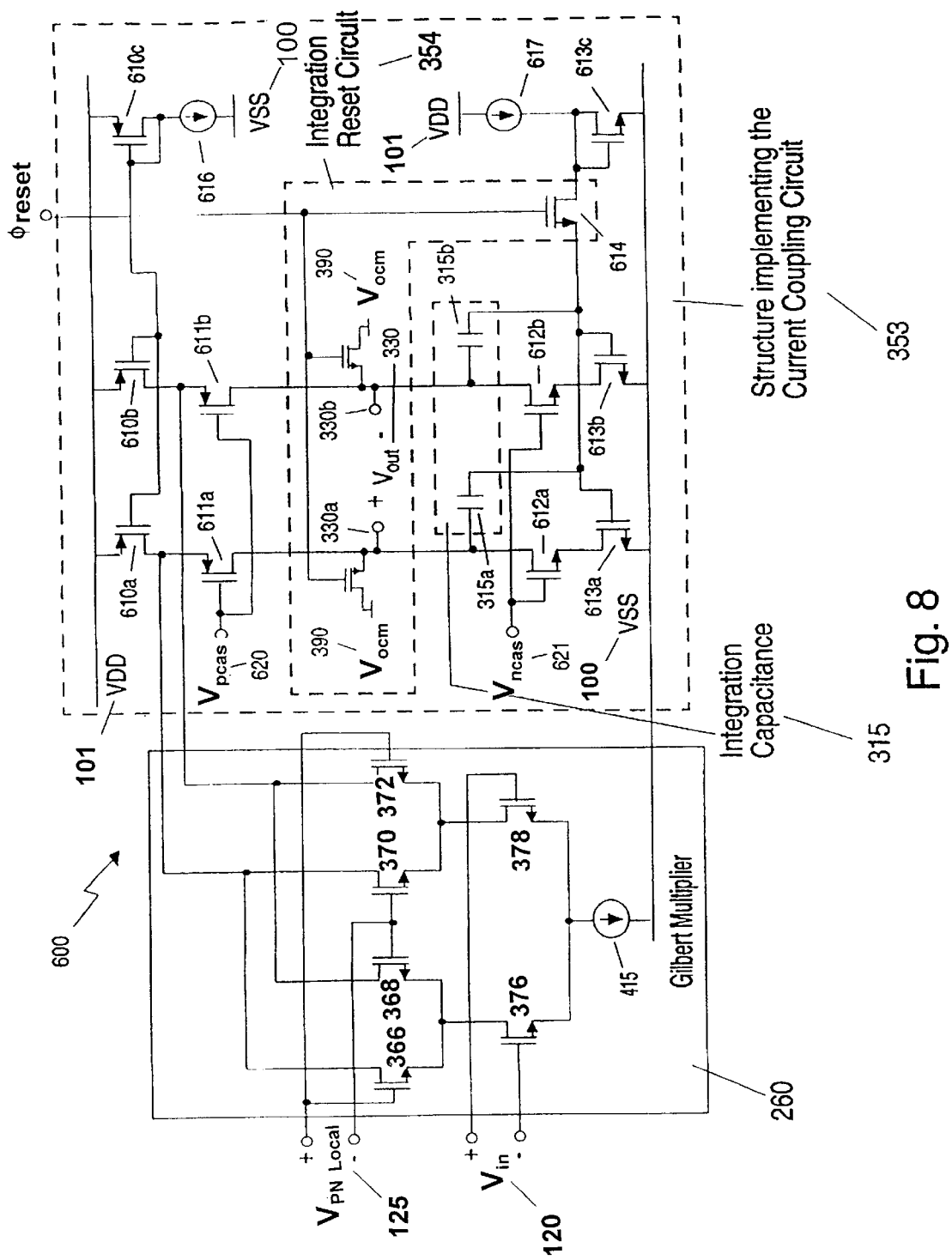
FIG. 8 is an illustration showing an exemplary embodiment of an IC correlator including the multiplier, current coupling circuit, load capacitors, and reset circuit where the correlator employs a folded-cascode integrator section also providing common-mode feedback.

Another embodiment of the Current Coupling Circuit 353, integration capacitors $C_{integrate1}$ 315a and $C_{integrate2}$ 315b, and the first and second integration reset circuits 373 and 383 of FIG. 3b are shown in FIG. 8. While the approach shown in FIG. 7 utilizes the so-called telescopic architecture, the embodiment of FIG. 8 utilizes a folded-cascode architecture. Compared with the telescopic architecture, the fold-cascode provides: increased output voltage swing; more flexibility in definition of the output common-mode voltage level; and increased output resistance at the output nodes. A high output resistance is important in order to maintain linearity in the integration function.

With this embodiment, the Gilbert Multiplier couples to the sources of PMOS common-gate transistors 611a and 611b. PMOS transistors 610a and 610b mirror the current in 610c and act as first and second current sources, providing bias current from VDD 101 to the Gilbert multiplier and to first and second NMOS cascode current sources comprised of transistor pair 612a and 613a and transistor pair 612b and 613b (where 612a and 612b are the cascode transistors), through first and second PMOS common-gate transistors 611a and 611b. Assuming the DC bias current from VDD 101 is equal to the sum of the DC bias current into VSS 100 through the Gilbert Multiplier 260 biasing current source and the first and second NMOS cascode current sources, the differential multiplier output current 310 from the Gilbert multiplier 260 can only flow into the integration capacitance 315a and 315b. Thus, this coupling circuit 353 utilizing the folded-cascode architecture removes the bias term (as did the telescopic architecture described earlier) and couples only the signal carrying term to capacitors 315a and 315b as is preferred. (Alternatively, both bias and signal terms of the multiplier output current 310 can be output to the integration capacitors and the resulting common-mode voltage resulting from the bias term removed by a later signal processing step as was the case with the telescopic architecture.) Once again, the integration capacitance 315a and 315b perform double duty, acting as the integration capacitance and participating in common-mode feedback. The presence of common-mode feedback ensures the assumption that the total DC bias current from VDD 101 is equal to the total DC bias current into VSS 100. Switching and operation of the integration reset circuit 354 is similar to that with the telescopic architecture except that it uses NMOS transistors and thus, is not described again.

This architecture can also benefit from the use of gain-boost amplifiers that involve the use of amplifier stages and the cascode devices 611a, 611b, 612a, and 612b to further increase output resistance, and thus the linearity of the integration. This well known technique is described in the literature and is not described further.

Both the telescopic and folded-cascode architectures have been used in transconductance amplifiers for CMOS and BiCMOS A/D converters, digital-to-analog converters, and other mixed-signal applications.

A preferred embodiment of the PN Code Level Translator 360 is now described. The Receive PN code generator output 121 is a digital signal with binary values equal to the power supply (VDD 101) or ground 100 as shown in the left side of FIG. 9a. These levels are not suitable to interface to Gilbert cell embodiments of the multiplier 260 which require differential signals $V_{PN\_Local+}$ 125a and $V_{PN\_Local-}$ 125b as shown in the right side of FIG. 9a. Reference voltages or binary levels V1 461 and V2 462 are designed with the following three design goals described in the discussion of the design of the Gilbert multiplier design above and summarized here: a) so that their average value provides an appropriate common-mode level for input $V_{PN\_Local}$ 125 to the Gilbert multiplier 260; b) so that the voltage swing is large enough to switch the current between current switch devices in the Gilbert multiplier 260, and c) so that the node voltages at the drains of the input differential pair 376, 378 connected to $V_{in}$ 120 is minimized during switching of input 125.

A preferred embodiment of the PN Code Level Translator 360 is shown in FIG. 9b. This implementation has the advantages of zero DC power in all portions of the translation circuit that are switching with the PN code and a high operating speed capability. Reference voltage levels V1 461 and V2 462 are applied to multiplier input nodes 125a and 125b through switches 484–487 controlled by receive PN code generator output 121 via logic circuits contained in the PN Code Level Translator Logic 488. The PN Code Level Translator Logic 488 converts input 121 to generate control signals 482 and 483 that are alternately active and control switches 484–487. For example, in one implementation, when input 121 is logic HIGH, 482 is active HIGH and 483 is in the inactive state LOW. Under these conditions, 482 activates switches S1 484 and S4 487 connecting input $V_{PN\_Local+}$ 125a to V1 461 through switch S1 484 and $V_{PN\_Local-}$ 125b to V2 462 through switch S4 487. Meanwhile 483 is inactive, and switches S2 485 and S3 486 are in the off state. In this implementation, when input 121 is logic LOW, 483 is active HIGH and 482 is in the inactive state LOW. Under these conditions, input $V_{PN\_Local+}$ 125a connects to V2 462 through switch S2 485 and $V_{PN\_Local-}$ 125b connects to V1 461 through switch S3 486. Meanwhile control signal 482 is inactive, and switches S1 484 and S4 487 are in the off state.

The first and second reference voltages V1 461 and V2 462 can be generated in a number of ways. One embodiment is to use a resistor ladder from the power supply (VDD 101) to ground 100 and tap off at appropriate points to define reference voltage levels 461 and 462. The use of large resistor values in the resistor ladder minimizes the power dissipated by this circuit. Appropriate use of capacitors (not shown) connected between first and second reference voltages V1 461 and V2 462 and ground minimize the magnitude of voltage transients on first and second reference voltage levels 461 and 462 during switching.

From this description at the block and circuit levels, it is clear that the inventive structure advantageously provides the correlation function as required in communication systems employing DS-CDMA signaling enabling architectures and implementations that: can achieve lower power consumption than conventional digital methods with the use of simple, power efficient circuit structures; are amenable to integration in low-cost integrated circuit technologies and can thus result in increased system integration at lower cost than previous analog implementations utilizing surface acoustic wave (SAW) filter technology; can achieve a higher sensitivity than practical digital implementations by performing the correlation prior to the introduction of quantization noise introduced by analog-to-digital conversion; can accommodate a higher dynamic range by maintaining linearity in the correlation over a wider input signal range than practical digital implementations; can require less area on an integrated circuit as compared with a digital approach due to its simplicity; and have qualities that will become increasingly attractive when compared to digital implementations as chip rates and data rates increase since very high bandwidth multiplication and integration can be implemented by the simple, elegant structure of a multiplier cell whose output current feeds a capacitor to implement a correlator using circuit structures similar to that described.

This inventive structure is capable of providing this function for other applications requiring the determination of the correlation between two signals; but is especially effective when one of the signals is a binary signal or can be approximated as such as is the case in the baseband processing of DS-CDMA systems where the PN sequence is a binary signal.

The present invention provides significant advantages over the prior art. Some of the important effects of the present correlator which can function for DS-CDMA receivers in the analog domain include: (1) receivers with significantly lower power consumption than with conventional digital and recently proposed analog approaches; (2) amenable to integration on low-cost integrated circuit processes such as digital silicon CMOS technologies, thus resulting in high-integration receivers; (3) performing correlation prior to the analog-to-digital conversion and thus realizes the benefits of DS-CDMA processing to continuous-wave and other interferers; and (4) large input dynamic range, relaxing requirements of power control in overall system design.

All publications, patents, and patent applications mentioned in this specification are herein incorporated by reference to the same extent as if each individual publication or patent application was specifically and individually indicated to be incorporated by reference.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

We claim:

1. A correlator for analog domain signal processing, comprising:
   a correlator having a first input signal and a second input signal, a multiplier coupled with a current coupling circuit, the current coupling circuit further coupling with an integration and dump circuit, where the first input signal is in an analog domain;
   the multiplier multiplies the first input signal and the second input signal producing a multiplier output; and
   the multiplier output is forwarded by the current coupling circuit to the integrate and dump circuit to be integrated by the integrate and dump circuit producing a correlator output and the integrate and dump circuit providing a common-mode feedback.

2. The correlator as claimed in claim 1, further comprising:
   a reset circuit coupled to the integrate and dump circuit; and
   the integration reset circuit resets the integrate and dump circuit.

3. The correlator as claimed in claim 1, wherein: the multiplier output is a current.

4. The correlator as claimed in claim 1, wherein: the integrate and dump circuit includes integration capacitance.

5. The correlator as claimed in claim 1, wherein: the integrate and dump circuit includes at least two time-interleaved integrate and dump circuits.

6. The correlator as claimed in claim 1, wherein: the second input signal is binary generated from a level translator coupled to the multiplier.

7. A correlator for spread spectrum applications utilizing continuous-time analog domain signal processing, comprising:
   a differential correlator receiving a first input signal in an analog domain and a second input signal;
   the correlator comprising a multiplier coupled to a differential integrate and dump circuit and an integration reset circuit coupled to the differential integrate and dump circuit;
   the multiplier multiplies the first input signal and the second input signal producing a multiplier output current;
   the multiplier output current is integrated by the differential integrate and dump circuit producing a correlator output voltage; and
   the integration reset circuit resets the differential integrate and dump circuit to a reset voltage.

8. The correlator as claimed in claim 7, wherein: the differential integrate and dump circuit is coupled to the multiplier through a current coupling circuit.

9. The correlator as claimed in claim 7, wherein: the second input signal is generated from a PN code generator translated by a PN code level translator coupled to the correlator.

10. A correlator for use in continuous-time analog spread spectrum applications, comprising:
    a correlator having a first input signal and a second input signal;
    the correlator comprising a multiplier, a current coupling circuit, an integration capacitance and an integration reset circuit;
    the multiplier is coupled to the current coupling circuit, the current coupling circuit is coupled to the integration capacitance, such that the multiplier multiplies the first input signal and the second input signal producing a multiplier output current;
    the multiplier output current is coupled through the current coupling circuit by the integration capacitance producing a correlator output voltage; and
    the integration reset circuit is coupled to the integration capacitance and resets the integration capacitance.

11. The correlator as claimed in claim 10, wherein: the second input signal is a binary PN code signal.

12. The correlator as claimed in claim 10, wherein:
    a PN code level translator is coupled to the multiplier; and
    the PN code level translator generates the second input signal which is input into the correlator.

13. The correlator as claimed in claim 12, wherein: the PN code level translator having a translation circuit such that the translation circuit consumes substantially zero DC power.

14. The correlator as claimed in claim 12, wherein: the PN code level translator includes a plurality of control switches to generate the second input signal.

15. The correlator as claimed in claim 14, wherein:
    the PN code level translator having two separately generated bias voltages; and
    the plurality of switches having a first state and a second state, wherein each switch couples to one of the two bias voltages when in the first state.

16. The correlator as claimed in claim 12, wherein:
    the PN code level translator includes PN code translator logic which controls a plurality of control switches, the control switches generate the receive PN code signal.

17. The correlator as claimed in claim 10, wherein: the correlator is configured in a fully-differential architecture.

18. The correlator as claimed in claim 10, wherein: the integration capacitance includes a first integration capacitance and a second integration capacitance producing a differential correlator voltage output.

19. The correlator as claimed in claim 10, wherein: the correlator is configured in a telescopic architecture.

20. The correlator as claimed in claim 10, wherein: the correlator is configured in a folded-cascode architecture.

21. The correlator as claimed in claim 10, wherein: the first input signal is in an analog domain.

22. The correlator as claimed in claim 10, wherein:
    the first input signal having a series of binary data bits; and the integration capacitance is reset once per data bit following an end of a data bit correlation.

23. The correlator as claimed in claim 10, wherein:
the correlator output is coupled to a sample block which samples the correlator output producing a sampled output; and
the sample block is coupled to an accumulator which sums the sampled output producing a composite correlator output.

24. The correlator as claimed in claim 10, wherein: the multiplier is a Gilbert Multiplier.

25. The correlator as claimed in claim 24, wherein:
the Gilbert multiplier includes a first upper transistor pair and a second upper transistor pair and a lower transistor pair; and
the lower transistor pair includes a plurality of degeneration resistors.

26. The correlator as claimed in claim 10, wherein:
the first input signal is an arbitrary shape signal; and
the second input signal is a binary sequence signal.

27. A communication channel receiver for baseband signal processing, comprising:
a multiplier coupled with an integrate-and-dump circuit;
the multiplier receives a first input signal and a second input signal such that the multiplier multiplies the first input signal and the second input signal and produces a multiplier output wherein the multiplier output includes a signal carrying term and a bias term; and
the multiplier signal carrying term is integrated by the integrate-and-dump circuit which produces a correlator output proportional to the product of the first input signal and the second input signal.

28. The communication channel receiver as claimed in claim 27, wherein: the second input is a binary PN code.

29. The communication channel receiver as claimed in claim 28, further comprising:
a PN code level translator which is coupled to the multiplier; and
the PN code level translator generates the second input signal inputted into the multiplier to be multiplied with the first input signal.

30. The communication channel receiver as claimed in claim 27, wherein: the correlator is configured in a fully-differential architecture.

31. The communication channel receiver of claim 27, wherein:
the integrate-and-dump includes at least one integration capacitance coupled to a integration reset circuit;
the multiplier output is integrated by the integration capacitance; and
the integration reset circuit resets the integration capacitance to allow the integration capacitance to again integrate the multiplier output.

32. The communication channel receiver as claimed in claim 31, wherein:
the integrate-and-dump includes a sampling circuit which is coupled to the integration capacitance; and
the sampling circuit samples the integration capacitance prior to the integration capacitance being reset by the integration reset circuit.

33. The communication channel receiver as claimed in claim 27, wherein: the multiplier output is a current which is integrated by the integrate-and-dump.

34. The communication channel receiver as claimed in claim 27, wherein: the integrate-and-dump includes an integration capacitance such that the multiplier output is integrated by the integration capacitance.

35. The communication channel receiver as claimed in claim 34, wherein: the correlator including the integration capacitance is formed on a single IC die.

36. A communication channel receiver, comprising:
a differential correlator having two inputs, a receive baseband input signal and a receive PN code signal and generating a continuous time correlator output voltage proportional to the product of the receive baseband signal and the PN code signal;
the correlator is coupled to an analog to digital converter which converts the correlator output voltage to a digital signal;
the analog to digital converter is coupled to a decision device and a synchronization circuit such that the digital signal is directed to both;
the decision device generates output bits;
the synchronization circuit generates a control signal;
the synchronization circuit is coupled to a controlled oscillator which receives the control signal and generates a clock signal;
the controlled oscillator is coupled to a receive PN code generator which receives the clock signal which produces a PN code generator output; and
the PN code generator is coupled to a PN code level translator which receives the PN code generator output and produces the receive PN code signal which is inputted into the correlator.

37. A method for correlating two signals utilizing a continuous-time signal analog implementation, comprising:
multiplying a first analog input signal with a second input signal producing a multiplier output current;
coupling the multiplier output current through a current coupling circuit to an integration capacitance;
differentially integrating the multiplier output current using the integration capacitance generating a correlator output voltage across the integration capacitance; and
reinitializing the integration capacitance.

38. The method of correlating two signals as claimed in claim 37, wherein:
the step of integrating including integrating the multiplier output current by the integration capacitance for a correlator correlation period;
sampling the correlator output voltage at least once during each correlator correlation period producing a correlator output sample;
reinitializing the integration capacitance once every correlator correlation period; and
accumulating the correlator output sample over the duration of a data bit period.

39. The method of correlating two signals as claimed in claim 38, wherein: the data bit period exceeds the correlator correlation period.

40. The method of correlating two signals as claimed in claim 38, further comprising:
sampling the correlator output voltage;
generating a sample output signal;
converting the sample output signal from an analog domain to a digital domain, producing a digital representation of the correlator output signal; and looping the digital representation of the correlator output signal through a synchronization loop generating the second input signal of a receive PN code signal, to be multiplied with the first input signal of a receive baseband signal.

41. The method of correlating two signals as claimed in claim 40, further comprising:

including a PN code level translator in the synchronization loop to generate the PN code signal to be multiplied with the receive baseband signal.

42. The method of correlating two signals as claimed in claim 37, further comprising: generating the receive PN code signal from a PN code level translator coupled to the multiplier.

43. The method of correlating two signals as claimed in claim 37, wherein: correlating the first input signal with the second input signal for a finite duration.

44. The method of correlating two signals as claimed in claim 37, wherein: correlating the first input signal with the second input signal periodically.

45. A method of correlating a communication signal for use in communication channel receiver, comprising:

converting a first input signal from a voltage to a current;

multiplying the current with a second input signal producing a multiplied output current having a signal current and a bias current;

removing the bias current; and integrating the signal current by an integrate-and-dump circuit effecting correlation.

46. The method of correlating a communication signal as claimed in claim 45, wherein: multiplying the current with a second input signal through a switch matrix.

47. A correlator for spread spectrum applications utilizing analog domain signal processing, comprising:

a means for multiplying a first analog input signal and a second input signal to generate a multiplied output current;

a means for coupling the multiplied output current to a means for integrating, including a means for removing a bias current; and the means for integrating configured to integrate output current producing a correlated output voltage.

* * * * *

UNITED STATES PATENT AND TRADEMARK OFFICE
CERTIFICATE OF CORRECTION

| | | |
|---|---|---|
| PATENT NO. | : 6,330,274 B1 | Page 1 of 1 |
| APPLICATION NO. | : 09/391117 | |
| DATED | : December 11, 2001 | |
| INVENTOR(S) | : Uehara | |

It is certified that error appears in the above-identified patent and that said Letters Patent is hereby corrected as shown below:

Column 1, line 18, insert
-- Statement of Government Interest
This invention was made with Government support under Contract No. MIP9501726 awarded by the National Science Foundation. The Government has certain rights in the invention. --

Signed and Sealed this

Twenty-fifth Day of January, 2011

David J. Kappos
*Director of the United States Patent and Trademark Office*